May 18, 1965 F. A. DAVIS, JR., ET AL 3,183,750
PLASTIC BAG CUTTER
Filed Sept. 19, 1961 4 Sheets-Sheet 1
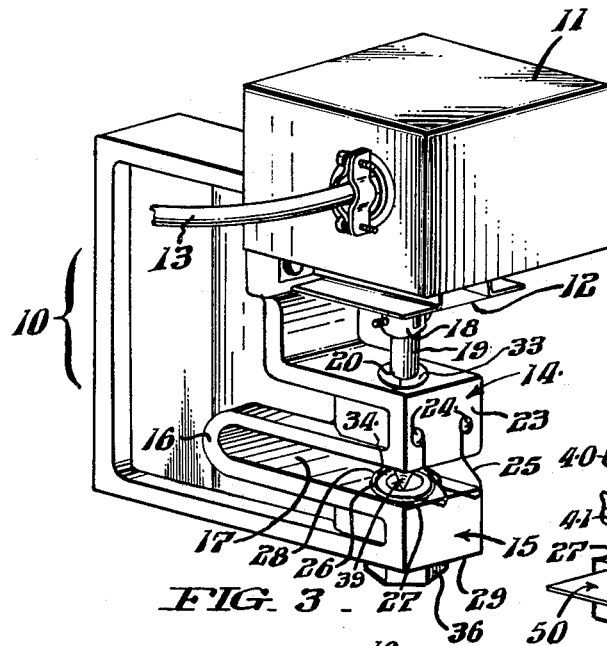
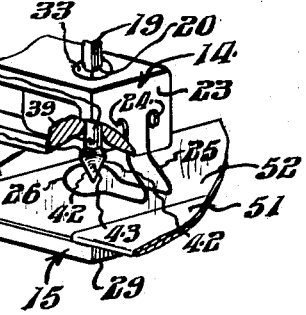
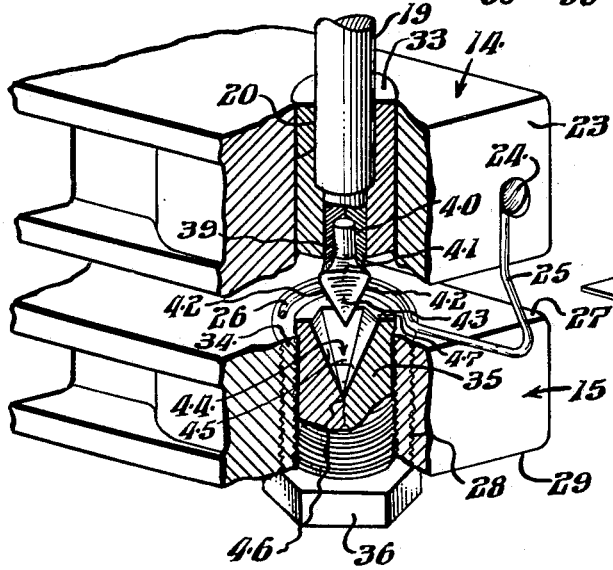
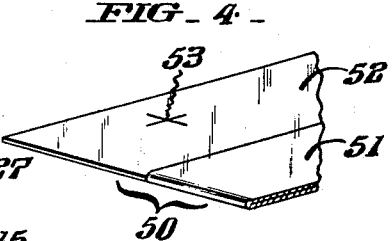
INVENTORS.
*Francis A. Davis, Jr. &*
BY *Joseph F. Flannery,*
*Paul & Paul*
ATTORNEYS.

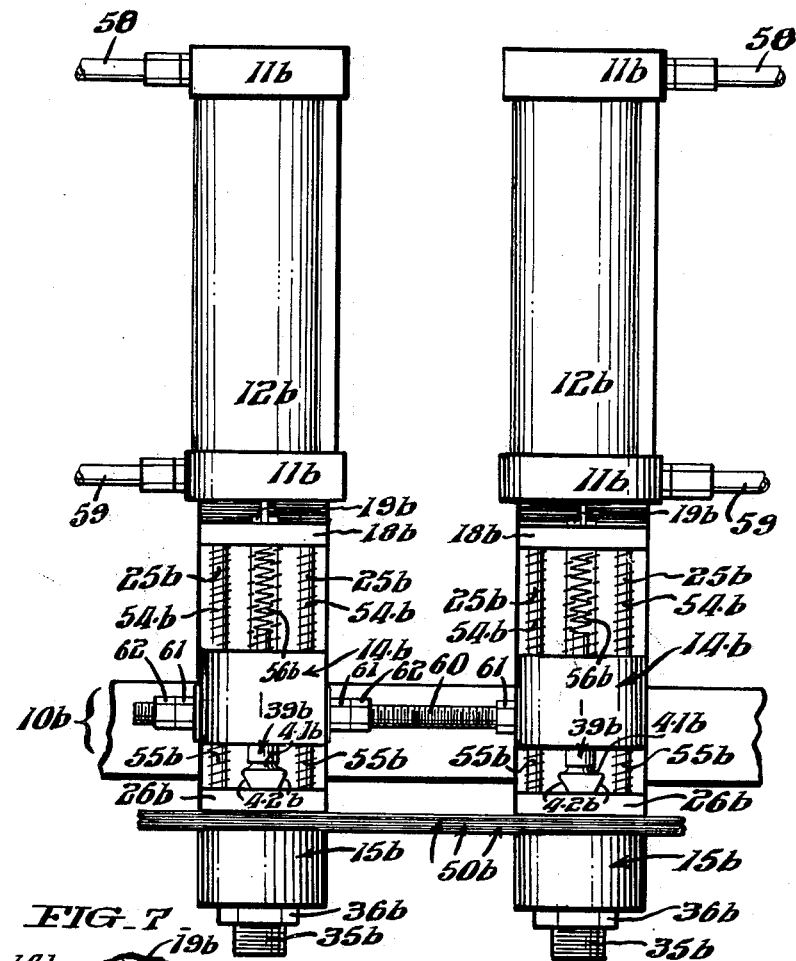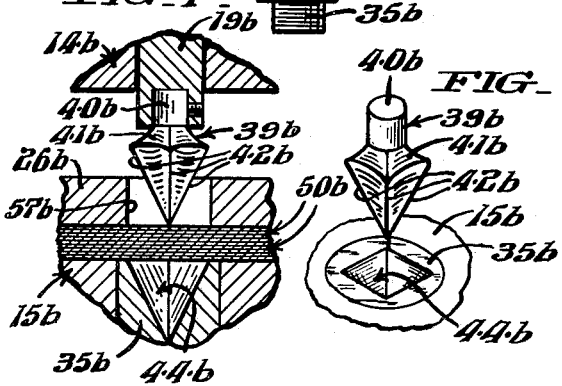

May 18, 1965 F. A. DAVIS, JR., ET AL 3,183,750
PLASTIC BAG CUTTER
Filed Sept. 19, 1961 4 Sheets-Sheet 4
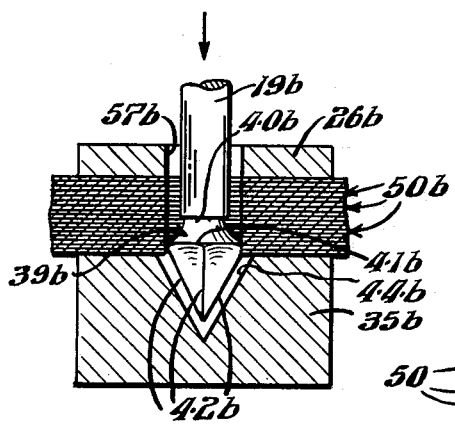
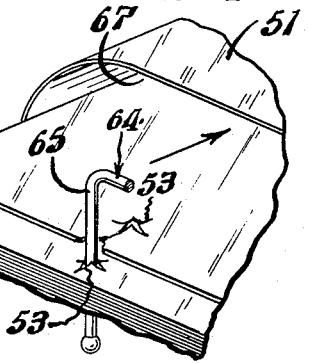
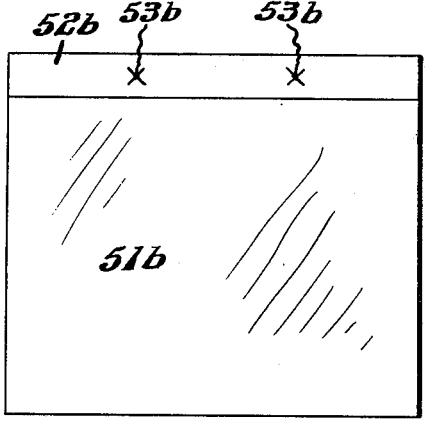
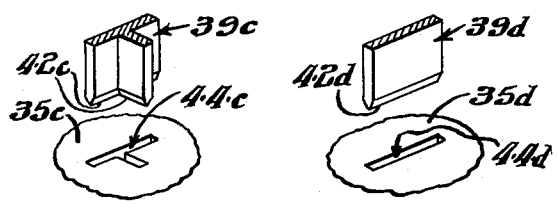
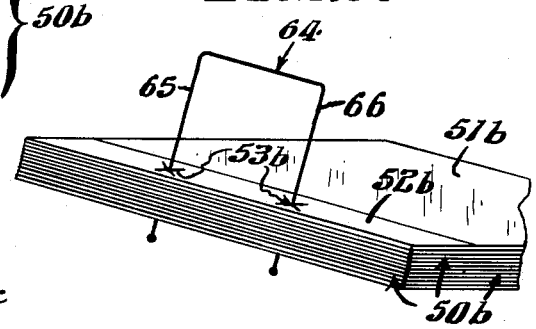
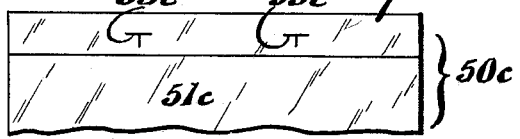
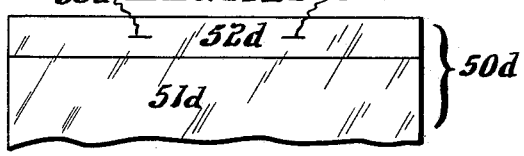
INVENTORS.
Francis A. Davis, Jr. &
BY Joseph F. Flannery,
Paul & Paul
ATTORNEYS.

United States Patent Office 3,183,750
Patented May 18, 1965

3,183,750
PLASTIC BAG CUTTER
Francis A. Davis, Jr., Lansdale, and Joseph F. Flannery, Philadelphia, Pa., assignors to Paramount Packaging Corporation, Chalfont, Pa., a corporation of Pennsylvania
Filed Sept. 19, 1961, Ser. No. 139,234
8 Claims. (Cl. 83—146)

This invention relates to apparatus and method for incising plastic material and the like. This invention further relates to apparatus and method for forming variously shaped incisions in continuously running plastic sheet material. This invention relates still further to a method of packaging materials in plastic containers and the like.

One of the objects of the present invention is to provide novel apparatus and method for incising sheet materials, such as plastic bags and the like.

It is another object of this invention to provide means for sharply incising sheet materials so that no part of said sheet materials is removed from the main body thereof in the incising operation.

It is another object of this invention to provide means for forming variously shaped incisions in continuously running plastic sheet material.

It is another object of this invention to provide novel and efficient means and method for packaging materials in incised plastic bags and similar containers.

Other objects and attendant advantages of the invention will appear hereinafter and in the drawings wherein:

FIG. 1 is a view in perspective of a material incising apparatus as provided in accordance with this invention;

FIG. 2 is a partial view in perspective, partly broken away, of a part of the apparatus shown in FIG. 1;

FIG. 3 is an enlarged view, partly in perspective and partly in section, of a part of the apparatus shown in FIG. 1;

FIG. 4 is a perspective view of plastic sheet material and an incision formed therein;

FIG. 6 is a view in front elevation of another modified form of incising apparatus as provided in accordance with this invention;

FIG. 7 is a view, partly in elevation and partly in section, of a part of the apparatus shown in FIG. 6;

FIG. 8 is a view in perspective of an incisor blade and die as provided in accordance with this invention;

FIG. 9 is a view partly in elevation and partly in section illustrating a specific arrangement of a part of the apparatus shown in FIG. 6;

FIG. 10 is a plan view of plastic material showing a modified incision as provided in accordance with this invention;

FIG. 11 is a partial view in top plan showing still another modification of incision as provided in accordance with this invention;

FIG. 12 is a partial view in top plan of plastic bag material showing still another modification of incision as provided in accordance with this invention;

FIG. 13 is a view in perspective of a modified incisor blade and die as provided in accordance with this invention;

FIG. 14 is a view in perspective of another modified form of incisor blade and die as provided in accordance with this invention;

FIG. 15 is a partial view in perspective of one arrangement of stacked plastic bags as provided in accordance with this invention; and, FIG. 16 is a partial view in perspective of one stage of the method of packaging materials as provided in accordance with this invention.

Figure 5:
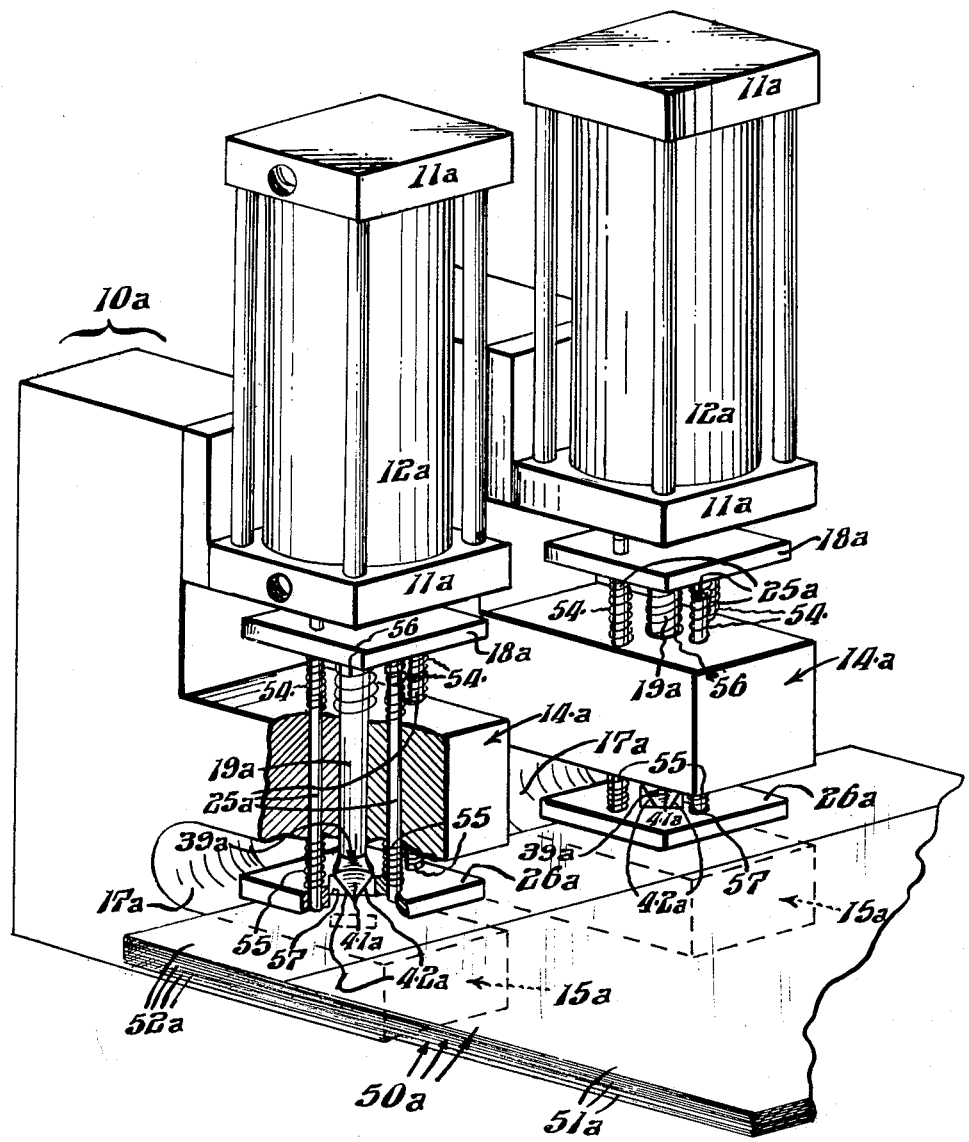
FIG. 5 is a view in perspective of a modified form of material incising apparatus as provided in accordance with this invention.

The following description is directed to the specific form of the invention illustrated in the drawings and is not intended to be addressed to the scope of the invention itself which may be practiced in a wide variety of forms and arrangements.

Adverting herewith to the specific form of the invention illustrated in the drawings, a material incising apparatus as shown in FIG. 1, for example, comprises a frame 10 to which is affixed a housing 11 for a solenoid 12 to which there leads an electric current carrying wire 13 for the energization thereof from a source of power not shown. Forward of the frame 10 are formed guide blocks 14 and 15 between which there is provided a U-shaped casting 16 formed integrally with the frame 10 which provides a space 17 between the guide blocks 14 and 15 for the passage of material therebetween. Attached to the plunger 18 of the solenoid 12 is a shaft 19 arranged for reciprocal movement upward and downward through a circular opening 20 in the guide block 14 provided for that purpose. Secured to the front end 23 of the guide block 14 by means of screws 24, is a wire stripper or hold-down 25 which is arranged to form a loop 26 which lies flat against the top surface 27 of the guide block 15 and substantially surrounds a circular opening 28 which extends completely through the guide block 15 to the bottom side 29 thereof.

As may be seen in FIG. 3, a sleeve 33 is immovably set into the cylindrical opening 20 extending through the guide block 14, which sleeve carries the reciprocating shaft 19. As may also be seen in FIG. 3, the cylindrical opening 28 provided in the guide block 15 is threaded for engagement with a sleeve 34 which sleeve is threaded on both the inside and outside cylindrical walls thereof and is in turn adapted to engage a substantially cylindrical die 35 having corresponding threads formed on the outer wall thereof and an adjusting lock nut 36 mounted to the bottom end thereof.

As may be seen in FIGS. 2 and 3, an incisor blade 39 having a shank 40 and an inverted pyramidal head 41 is affixed to the shaft 19 and accordingly arranged for reciprocal movement therewith. The inverted pyramidal head 41 is formed generally in the shape of a 4-sided pyramid and has cutting edges 42 at the junctures of the sides 43 thereof.

The die 35 has formed therein an inverted pyramidal space 44 having side walls 45 with the vertex 46 of the pyramidal space positioned centrally of the die 35 and the base of the pyramidal space opening into the top surface 47 thereof. It will be clear that the volumetric dimension of the inverted pyramidal space 44 in the die 35 is of approximately the same dimension as the inverted pyramidal head 41 of the incisor blade 39.

As may be seen in FIG. 2, a plastic bag 50 to be incised is positioned in the space 17 between the guide blocks 14 and 15 and is held flat against the top surface 27 of the guide block 15 and the top surface 47 of the die 35 by the loop 26 of the stripper 25. The plastic bag 50 comprises a body portion 51 and a flap portion 52, which latter portion is held for incision between the guide blocks 14 and 15 by the stripper 25.

In FIG. 4 is illustrated a portion of an incised plastic bag which may be a part of a long continuous strip of material out of which may be fashioned a plurality of plastic bags. In the flap 52, perpendicular slits or cuts have been incised to form an incision 53 in the form of a cross, the purpose of which will become more fully apparent hereinafter.

FIG. 5 illustrates a modification of the invention adapted to incise a plurality of sheets of plastic material and comprises a frame 10a to which are affixed mountings 11a arranged for the support of a pair of pneumatic cylinders 12a having piston rods (not shown) connected to support plates 18a and shafts 19a. Formed integrally with the frame 10a are a pair of upper guide blocks 14a and lower guide blocks 15a having therebetween generally U-shaped spaces 17a for the reception of a plurality of sheets of plastic bag material 50a having flap portions 52a and body portions 51a.

Mounted to the support plates 18a are rods 25a which pass through guide blocks 14a and have mounted thereto at the lower extremities thereof hold-down plates 26a, which plates function in a manner to be explained more fully hereinafter. As may be clearly seen in FIG. 5, springs 54 are mounted on the rods 25a between support plates 18a and top the surfaces of guide blocks 14a and springs 55 are mounted to the rods 25a between the bottom surfaces of guide blocks 14a and the hold-down plates 26a. As may also be seen in FIG. 5, springs 56 are also mounted on the reciprocating shafts 19a between the support plates 18a and the top surface of guide blocks 14a.

Affixed to the distal end of shafts 19a are incisor blades 39a having inverted pyramidal heads 41a and cutting edges 42a. Set in the lower guide blocks 15a are adjustable dies in all respects similar to those shown in FIG. 3 of the previously described modification of the invention and adapted to receive the pyramidal cutting heads 41a which are likewise in all respects similar to the cutting head of the previously described modification of the invention. As may be seen in FIG. 5, the hold-down plates 26a are provided centrally thereof with a square opening 57 of dimension to permit the cutting head 41a and shaft 19a to pass therethrough.

In FIG. 6 there is illustrated still another modification of the invention adapted to incise a plurality of sheets of plastic material in which there are mounted to a rigid frame 10b, a pair of hydraulic cylinders 12b having hydraulic fluid carrying lines 58 and 59 leading thereinto respectively at the tops and bottoms 11b thereof. To the piston rods of the cylinders 12b are secured support plates 18b in which are set the top ends of rods 25b, which rods pass through guide blocks 14b and are mounted at their bottom ends in hold-down plates 26b. Springs 54b are mounted on rods 25b between support plates 18b and guide 14b and springs 55b are mounted on rods 25b between guide blocks 14b and hold-down plates 26b.

Shafts 19b, to which are mounted springs 56b extending to the central portions of support plates 18b, extends through the guide blocks 14b centrally thereof and to the distal end thereof there is mounted an incisor blade 39b having a shank 40b and a head 41b with cutting edges 42b. As may be seen in FIG. 7 the head 41b has the shape of an inverted four-sided pyramid.

Below the hold-down plates 26b are mounted guide blocks 15b which also serve as die holders for dies 35b which may be adjusted therein by means of lock nuts 36b. Between the hold-down plates 26b and the guide blocks 15b are positioned a plurality of plastic bags 50b or similar sheet material for incision in a manner to be described hereinafter. As may be seen in FIGS. 7 and 8, dies 35b are provided with spaces 44b having the shape of an inverted pyramid and of dimension to receive the incising head 29b. FIG. 9 illustrates one position of the incising head 39b relative to the plastic bags 50b and the die 35b during the incising operation.

Cylinders 12b are mounted for translational motion across the frame 10b and extending between the aforesaid cylinders is an adjusting bolt 60 which passes through bolt retaining members 61 adjacent to which are positioned lock nuts 62, all for a purpose to be explained more fully hereinafter.

FIG. 10 illustrates a plastic bag 50b having a body portion 51b and a flap portion 52b containing incisions 53b which are cut into the flap portion 52b by rotating the incising heads 39b and dies 35b through an angle of 45°.

In FIG. 11 there is illustrated a plastic bag 50c having a body portion 51c and a flap portion 52c in which are formed incisions 53c which may be cut into the flap portion 52c by a modified incising head and die illustrated in FIG. 13.

In FIG. 13 is shown a T-shaped cutting head 39c having an arm and leg at the bottom of which are formed cutting edges 42c and a die 35c having a correspondingly T-shaped space 44c formed therein of dimension to receive the incising head 39c.

FIG. 12 illustrates a plastic bag 50d having a body portion 51d and a flap portion 52d in which are formed incisions 53d produced by a modified incising head and die shown in FIG. 14.

In FIG. 14 there is shown a generally wedge-shaped incising head 39a having a cutting edge 42d and a die 35d having a wedge-shaped space 44a formed therein of dimension to receive the incising head 39a.

FIG. 15 illustrates one arrangement of stacking a plurality of bags 50b which are secured to a wicket 64 having posts 65 and 66 which extend through the incision 53b in flaps 52b. FIG. 16 is an enlarged view of the post 65 of the wicket 64 shown in FIG. 15 and illustrates one stage in the process of packaging materials in accordance with this invention. In FIG. 16 the top bag of the stack of plastic bags 50 having an open mouth 67 is shown torn from the post 65 as the bag moves forward in the filling process.

Although in FIGS. 1, 2 and 3 only one solenoid and incising head have been shown attached to frame 10, ordinarily in the practice of this invention two incising heads operated by a pair of solenoids are used. In forming the incision 53 in the flap 52 shown in FIG. 4, a plastic bag is inserted the space 17 beneath the stripper loop 26 so that flap 52 lies flat against the top 27 of the guide block 15 and against the top 47 of the die 35. Energization of the solenoid causes the plunger thereof to fall driving the shaft 19 downward and driving the cutting head 41 through the plastic flap 52 into the space 44 in the die 35. In passing through the plastic flap 52 the cutting edges 42 of the incising head 41 cut the incision 53 into the flap 52 without punching any of the plastic material out of the flap. As a consequence, only neat slits or cuts are formed in the flap 52. After the incision 53 has been made in the flap 52 of the plastic bag 50, the solenoid is de-energized by controls not shown and the plunger thereof rises, thereby lifting the shaft 19 and the incising head 41 so that the incising head 41 again rises above the flap 52. Thereafter, the plastic bag 50 is removed and the operation may be repeated as desired. It will be understood that the plastic bag 50 may be part of a continuous strip of plastic bag material which may be continuously run through the incising apparatus by appropriate drive means.

In the practice of this invention in accordance with the modifications illustrated in FIGS. 5 and 6, a stack of plastic bags are neatly incised in the same manner in which a single bag was described as incised in the first-mentioned modification of the invention.

In the modification illustrated in FIG. 5, the flaps 52a of the plastic bag 50a enter the spaces 17a and, when in the desired position, are maintained flat against the guide blocks or die holders 15a by means of the hold-down plates 26a which are pressed downwardly by the force of the pneumatic cylinders 12a. The pneumatic cylinders similarly drive downward the shafts 19a so that the incising heads 41a pass through the holes 57 in the hold-down plates 26a and penetrate the stack of plastic bags 50a. In penetrating the plastic bags, the cutting edges 42a of the incising heads 41a cut neat incisions in the plastic bag in the same manner as described in the previous modification of the invention.

In the modification shown in FIG. 6, the hydraulic cylinders force downwardly the support plates 18b and consequently the hold-down plates 26b against the stack of plastic bags 50b while the incising head 41b passes through the hold-down plates 26b and plastic bags 50b to enter the space 44b in the die 35b.

It will be apparent that by means of the threaded die 35b, the die can be adjusted in the guide block or die holder 15b to the precise position desired and locked in the aforesaid position by means of the lock nut 36b.

In the modification illustrated in FIG. 6, the hydraulic cylinders 12b are mounted so that the distance between the cylinders may be adjusted by moving one or the other of the cylinders translationally toward or away from the other. The adjustment may be accomplished by loosening the lock nuts 62 and moving cylinder 12b so that the bolt 60 slides through the bolt retaining member 61 until the incising heads 41b are at the correct distance apart, after which the lock nuts 62 are again tightened against the bolt retaining member 61.

In the practice of this invention, plastic bags 50 incised in the manner aforedescribed are mounted on the wicket 64 and arranged for filling as illustrated in FIG. 16. The mouth 67 of the top bag is opened by a stream of air or other means and the bag filled at the same time with material which it is desired to package therein. In the filling process the bag is pulled away from the posts 65 and 66 along one of the arms of the incision 53 so that the flap 52 of the bag neatly tears away from the aforesaid post and the bag moves away, thereby exposing the next topmost bag of the stack for filling in like manner. After the bags have been filled as aforedescribed, the torn flap is removed in the process of heat-sealing the mouth 67 of the bag.

It will be apparent that an important advantage of the incising apparatus as provided in accordance with this invention resides in the manner in which incisions may be made in sheet material so that no part of the material is punched out or removed in the incising operaiton, thereby eliminating contamination of bags, sacks or similar containers formed therefrom by punched out pieces of sheet material. It will be appreciated that punched holes in plastic bags and similar containers result in the collection of a large number of punched out pieces of material which tend to become intermingled with the ultimate contents of the bag or container as a contaminate. However, by the incising method of this invention, this undesirable condition is entirely eliminated.

Another important feature of the invention lies in the novel and efficient method of packaging materials in plastic bags and the like wherein incisions formed in the plastic material in accordance with the method of this invention, provide means for easily removing the bag from wicket posts or the like by tearing along a line of incision.

Although this invention has been described with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described our invention, we claim:

1. Apparatus for incising sheet material comprising a support frame, a reciprocating shaft carried by said frame, an incising head affixed to an end of said shaft, a die mounted in said frame in alignment with said head, said die having a depression formed therein shaped to correspond to the shape of said head, said die being arranged to receive said head in said depression, guide means for positioning sheet material in said frame between said head and said die, means connected to said shaft for the reciprocal movement thereof whereby said head moves through said sheet material and into and out of said depression in said die, said shaft being arranged for reciprocal movement vertically in said frame, said die being disposed beneath said head, said head and said depression in said die both having the shape of an inverted four-sided pyramid and the cutting edges of said head being disposed at the junctures of the sides thereof.

2. Apparatus for incising sheet material comprising a support frame, a reciprocating shaft carried by said frame, an incising head affixed to an end of said shaft, a die mounted in said frame in alignment with said head, said die having a depression formed therein shaped to correspond to the shape of said head, said die being arranged to receive said head in said depression, guide means for positioning sheet material in said frame between said head and said die, means connected to said shaft for the reciprocal movement thereof whereby said head moves through said sheet material and into and out of said depression and said die, said shaft being arranged for reciprocal movement vertically in said frame, said die being disposed beneath said head, said head and said depression being T-shaped and the cutting edges of said head being at the bottom thereof.

3. Apparatus for incising sheet material comprising a support frame, a reciprocating shaft carried by said frame, an incising head affixed to an end of said shaft, a die mounted in said frame in alignment with said head, said die having a depression formed therein shaped to correspond to the shape of said head, said die being arranged to receive said head in said depression, guide means for positioning sheet material in said frame between said head and said die, means connected to said shaft for the reciprocal movement thereof whereby said head moves through said sheet material and into and out of said depression in said die, said shaft being arranged for reciprocal movement vertically in said frame, and die being disposed beneath said head, said head and said depression being wedge-shaped and the cutting edge of said die is at the bottom thereof.

4. Apparatus for incising sheet material comprising a support frame, a reciprocating shaft carried by said frame, an incising head affixed to an end of said shaft, a die mounted in said frame in alignment with said head, said die having a depression formed therein shaped to correspond to the shape of said head, said die being arranged to receive said head in said depression, guide means for positioning sheet material in said frame between said head and said die, means connected to said shaft for the reciprocal movement thereof whereby said head moves through said sheet material and into and out of said depression in said die, said shaft being arranged for reciprocal movement vertically in said frame, said die being disposed beneath said head, said die being adjustably mounted in a holder in front of said frame, said die being threadedly engaged in a correspondingly threaded sleeve and a lock nut disposed on the lower end of said die and arranged to abut the bottom surface of said holder.

5. The apparatus defined in claim 4 wherein said sleeve is threadedly engaged in a correspondingly threaded cylindrical opening formed in said holder.

6. Apparatus for incising sheet material comprising a support frame, a reciprocating shaft carried by said frame, an incising head affixed to an end of said shaft, a die mounted in said frame in alignment with said head, said die having a depression formed therein shaped to correspond to the shape of said head, said die being arranged to receive said head in said depression, guide means for positioning sheet material in said frame between said head and said die, means connected to said shaft for the reciprocal movement thereof whereby said head moves through said sheet material and into and out of said depression in said die, said shaft being arranged for reciprocal movement vertically in said frame, said die being disposed beneath said head, said guide means comprising a pair of guide blocks disposed one above the other on said frame with a space therebetween and a looped wire arranged to hold said sheet material flat against the lower of said guide blocks.

7. Apparatus for incising plastic sheet material comprising a support frame having a plurality of upper and lower guide blocks disposed forwardly thereof in vertically and horizontally spaced relation, a shaft arranged for vertically reciprocal movement through each of said upper guide blocks, an incising head detachably connected to the lower end of said shaft, a die adjustably arranged in each of said lower guide blocks, said die having a depression formed therein shaped to correspond to the shape of said head, means disposed between said upper and lower guide blocks for holding a plurality of sheets of plastic material therebetween, means connected to said upper guide blocks for adjusting the horizontal distance therebetween and means mounted on said frame and connected to the upper end of each of said shafts for moving each of said shafts to drive said head connected to the lower end thereof downward through said plastic sheet material into said depression in said die and to raise said head upward through said plastic material away from said die.

8. The apparatus defined in claim 7 wherein said drive means for each of said shafts, said upper blocks and said lower blocks are arranged in rigidly connected vertical columns and wherein said adjusting means comprises a screw bolt horizontally disposed between each of said columns and connected thereto.

References Cited by the Examiner

UNITED STATES PATENTS

| | | | |
|---|---|---|---|
| 414,314 | 11/89 | Hill | 83—700 |
| 522,953 | 7/94 | Bradley | 83—690 |
| 1,553,378 | 9/25 | Harper | 83—618 |
| 2,006,889 | 7/35 | Frommherz | 83—685 |
| 2,060,888 | 11/36 | Newman | 83—660 |
| 2,374,400 | 4/45 | Westervelt | 83—639 |
| 2,431,528 | 11/47 | Wells | 83—560 |
| 2,434,702 | 1/48 | Kopczynski | 83—146 |
| 2,568,863 | 9/51 | May | 83—146 |
| 2,949,712 | 8/60 | Bieberdorf | 53—29 |
| 2,981,039 | 4/61 | Pohl | 53—29 |
| 3,008,365 | 11/61 | McNabb | 83—575 |
| 3,087,366 | 4/63 | Stults | 83—660 |

FOREIGN PATENTS

| | | |
|---|---|---|
| 353,800 | 9/05 | France. |
| 963,443 | 7/50 | France. |

ANDREW R. JUHASZ, *Primary Examiner.*

CARL W. TOMLIN, *Examiner.*